United States Patent [19]

Nemoto

[11] 4,163,617
[45] Aug. 7, 1979

[54] BALL JOINT

[75] Inventor: Akira Nemoto, Toyohashi, Japan

[73] Assignee: Musashisemitsukoguo Kabushikikaisha, Japan

[21] Appl. No.: 875,485

[22] Filed: Feb. 6, 1978

[30] Foreign Application Priority Data

Feb. 14, 1977 [JP] Japan .................................. 52-14773
Feb. 14, 1977 [JP] Japan .................................. 52-14774

[51] Int. Cl.² .......................... F16C 11/00; F16D 1/12
[52] U.S. Cl. ...................................... 403/132; 403/144; 403/133; 403/135
[58] Field of Search ........................ 403/56, 76, 90, 36, 403/38, 39, 122, 132, 133, 134, 135, 140, 144, 126, 138; 280/674

[56] References Cited

U.S. PATENT DOCUMENTS

| | | | |
|---|---|---|---|
| 2,973,980 | 3/1961 | Vogt et al. ........................... | 403/133 |
| 3,561,800 | 2/1971 | Hassan ............................... | 403/132 X |
| 3,574,368 | 4/1971 | Songer ............................... | 403/133 X |
| 4,003,667 | 1/1977 | Gaines et al. ...................... | 403/132 X |

Primary Examiner—Wayne L. Shedd
Attorney, Agent, or Firm—William Anthony Drucker

[57] ABSTRACT

A ball joint comprises a circular cylindrical housing with at least one opening, a bearing member contained in the housing, a ball stud with its ball head pivotally supported by the bearing member, and a closing plate press-fitted in the opening so as to close the opening and to generate the contact pressure between the bearing member and the ball head.

9 Claims, 15 Drawing Figures

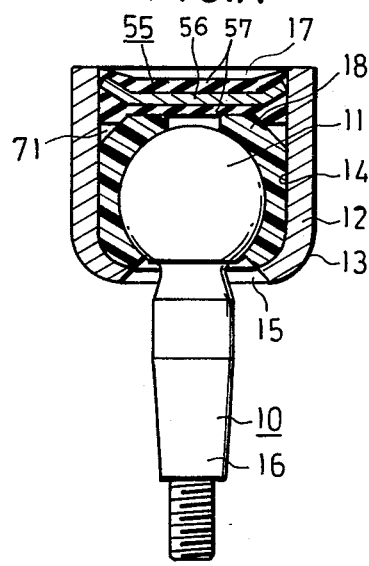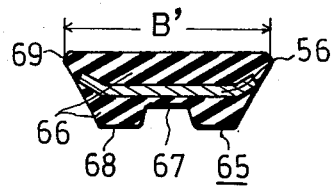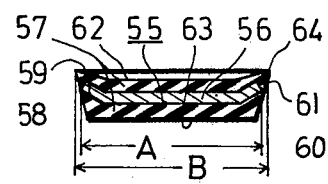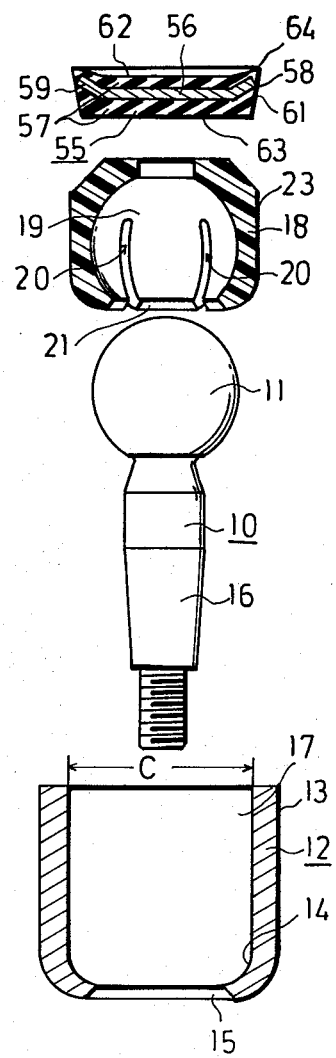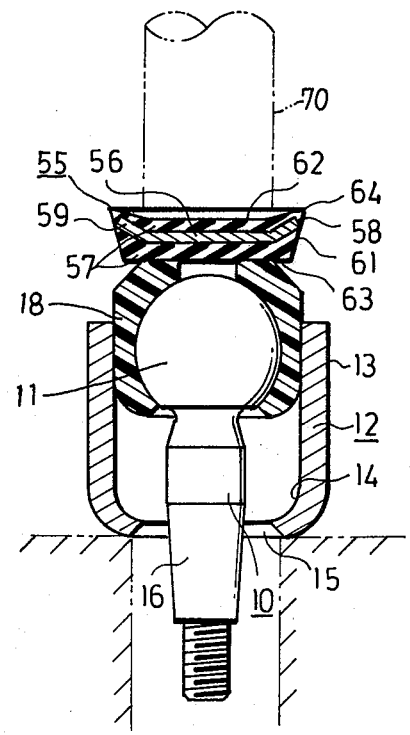

BALL JOINT

BACKGROUND OF THE INVENTION

This invention relates to reducing steps of working component parts and of assembling them in manufacturing ball joints. It relates also to an improved ball joint in which the open marginal edge of a housing need not be turned or rolled toward a closing plate put inside the marginal edge, and the preload applied to the ball head of a ball stud can be adjusted properly.

A conventional ball joint comprises a housing having a circular cylindrical internal surface, a ball stud with its ball head contained in the housing, a synthetic resin or sintered alloy bearing member supporting the ball head in the housing. A closing plate is put inside the open end of the housing and is fastened by folding the marginal open edge of the housing towards the closing plate by means of rolling and the like. The closing plate thus fastened presses the bearing member to its enclosed assembled position directly or through a suitable resilient member such as a piece rubber or a spring. The marginal open edge of the housing must be machined precisely into a thin form which is designed for the more reliable fastening of the closing plate and for the proper value of the preload. Furthermore, in order to give the ball head the proper preload, it is necessary to provide a shoulder portion to receive the closing plate on the internal surface of the open end portion of the housing, or to fasten the closing plate under a pressure to press it against the bearing member. Namely, the working and assembling of the housing requires not only many steps but also precision of high degree, and complicated machinery improved for exclusive use are necessary.

SUMMARY OF THE INVENTION

An object of the present invention is to provide a ball joint in which the open end of a housing having a ball head and a bearing member contained in itself can be closed completely by a simple process such as simply to press-fit a closing plate in the open end of the housing.

Another object of the present invention is to provide a durable ball joint whose closing plate can be maintained reliably in its closing position throughout the usage of the ball joint despite the force exerted by a moving ball joint on the closing plate and despite the simple press-fit mounting as described above of the closing plate.

Still another object of the present invention is to provide a ball joint in which the open end of a housing can be closed reliably by a closing plate despite some possible variations in the internal diameter of the open end of the housing and the diameter of the closing plate, and therefore whose production is very easy because the component parts can be produced without any high degree of precision.

In the drawings:

FIG. 11 is a longitudinal sectional view of a still another ball joint assembled completely;

FIG. 12 is a sectional view of a closing plate as an alternative to the closing plate used in the ball joint shown in FIG. 11;

FIG. 13 is a sectional view of the closing plate used in the ball joint shown in FIG. 11;

FIG. 14 is a longitudinal sectional view showing the component parts dismounted from the ball joint shown in FIG. 11; and FIG. 15 is a longitudinal sectional view, showing an intermediate stage where the component parts of FIG. 14 is assembled into a complete ball joint.

Figure 1:
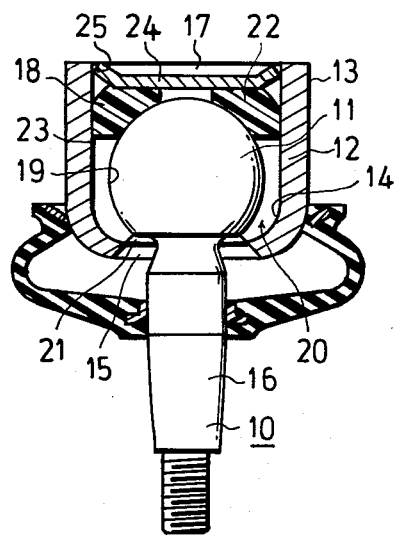
FIG. 1 is a longitudinal sectional view of a ball joint having been assembled completely.
Figure 3:
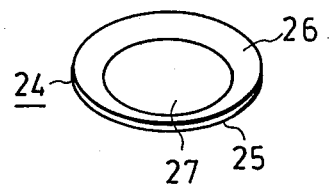
FIG. 3 is a perspective view of a closing plate used in the ball joint shown in FIG. 1.
Figure 4:
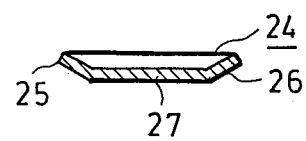
FIG. 4 is a sectional view of the closing plate shown in FIG. 3.

Referring to FIGS. 1, 3 and 4, a ball stud 10 has a ball head 11. A housing 12 is cold-forged into a form almost the same as the one shown in the figure in order to dispense with after-processing. This housing has an external surface 13 and an internal surface 14 which are substantially of circular cylindrical form as a whole. Through one end wall of the housing 12, a small aperture 15 is bored through which the shank 16 of the ball stud 10 can extend, and the other open end of the housing 12 serves as a large housing opening 17. A ball seat 18, made of synthetic resin such as polyethylene as a bearing member, has a segmentally spherical ball receiving internal surface 19 conformable with the ball head 11, and several half-way bearing slots 20 extending from an insertion hole 21 for the ball head 11 at one end of the ball seat 18 towards the other end 22 of the ball seat 18. The ball seat 18 has an external surface 23 with a diameter slightly larger than that of the internal surface 14 of the housing 12 and approximately conformable with the internal surface 14.

A dish-shaped closing plate 24 made of rolled steel or spring steel is shown perspectively in FIG. 3 and sectionally in FIG. 4. The closing plate 24 has an outer edge 25 with a diameter larger than that of the internal surface 14 near the housing opening 17, a slanting surface 26 extending from the outer edge 25 inwardly towards the ball head 11, and a flat surface 27 intergral with the internal edge of the slanting surface 26 and pressing directly on the rear surface of the ball seat 18. The dish-shaped closing plate 24 must be mounted in such a relationship as to make the flat surface 27 always confront the ball seat 18. This is because the slanting surface 26 of the closing plate 24 must be deformed to enlarge its outer diameter by the pushing or pulling load applied in the longitudinal direction of the ball stud 10 during usage of the ball joint, and subsequently the enlarged counter force resulting from the enhanced engagement between the housing internal surface 14 and the outer edge 25 should prevent the engagement from being dislocated easily. Thus, various modifications of the closing plate 24 having such a function as to make sure the engagement can be considered. Several example of them are illustrated in FIGS. 2, 5, 6, and 10.

Figure 2:
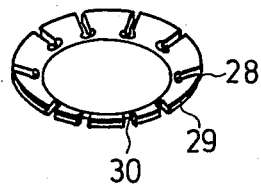
FIG. 2 is a perspective view of a closing plate having several half-way slots at its slanting side.
Figure 5:
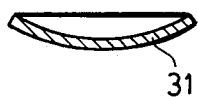
FIGS. 5 and 6 are sectional views of closing plates of forms different from that of FIG. 4.
Figure 6:
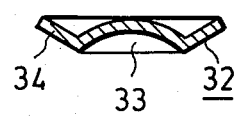

The closing plate 28 of FIG. 2 has tongue-shaped slanting pieces 29 sectionalized by several closing slots 30 cut in the slanting side of the closing plate 28. The resistive force, occurring at the time of press-fit assembling of the closing plate 28, can be reduced by the closing slots 30. The closing plate 31 of FIG. 5 is substantially part-spherical. The closing plate 32 of FIG. 6 comprises a central convex part-spherical surface 33 and a peripheral annular slanting side 34. All of these closing plates can be manufactured easily by press or constriction.

Figure 8:
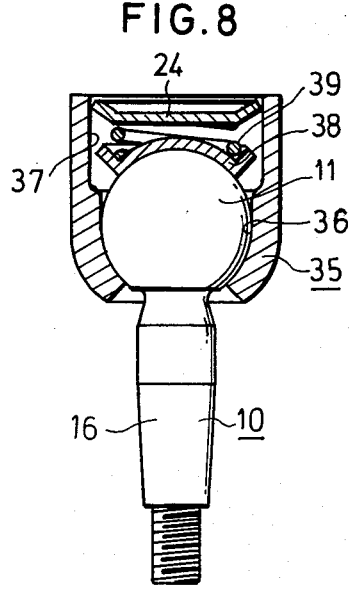
FIG. 8 is a longitudinal sectional view of another ball joint having been assembled completely.

Next, referring to FIG. 8, a spring-type ball joint is described. Common component parts of different kinds of ball joints are given the same reference numeral, and the description of them is not repeated. A housing 35 has a part-spherical internal surface 36 nearly conformable with the ball head 11 and a circular cylindrical internal surface 37. A ball seat 38 as a bearing member contacts with the spherical surface of the ball head 11 in conformable relationship. The ball seat 38 is made of sintered alloy or the like. A compressed coil spring 39 is inserted between the ball seat 38 and the closing plate of FIG. 3 press-fitted in the open end of the housing 35, and cause the ball seat 38 be in pressed contact with the ball head 11.

Figure 9:
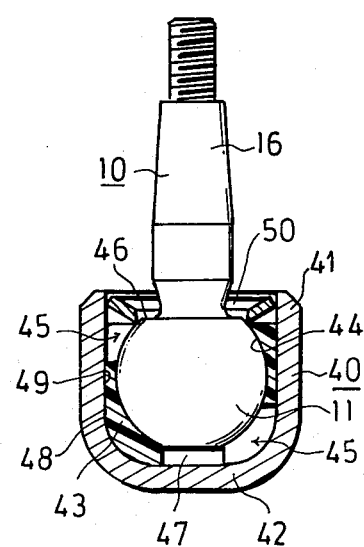
FIG. 9 is a longitudinal sectional view of still another ball joint having been assembled completely.
Figure 10:
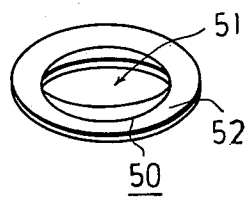
FIG. 10 is a perspective view of the closing plate used in the ball joint shown in FIG. 9.

A housing 40 with only one open end is used in the ball joint of FIG. 9. The circular cylindrical housing 40 has an open end 41 and an opposite closed end 42. A ball seat 43 has a ball receiving segmentally spherical internal surface 44 conformable with the ball head 11, and several half-way poloidal bearing slots 45 extending from an insertion hole 46 for the ball head 11 or from a bottom small aperture 47. The ball seat 43 has an external surface 48 with a radius nearly equal to or slightly larger than one suitable for the conformation with the internal surface 49 of the housing 40. A closing plate 50 is press-fitted in the open end 41 of the housing 40, and is shown perspectively in FIG. 10. This closing plate 50 has a central elongated projection hole 51 for the ball stud, and a slanting annular portion 52, unlike the closing plates of FIGS. 2, 3, 5, and 6. The closing plate 50 is mounted in such a relationship that the internal edge of the annular portion 52 slants towards the ball head 11 and therefore away from the shank 16 of the ball stud 10.

Next, the assembling of the ball joint shown in FIG. 1 is described. The ball stud 10 and the ball seat 18 as the bearing member, which are separate from each other or pre-assembled, are inserted into the interior of the housing 12 through the housing opening 17. Then, the flat surface 27 of the closing plate 24 is pushed by a press, and is inserted forcedly inside the internal surface 14 under a proper pressure calculated beforehand. As the result, the outer edge 25 of the closing plate 24 is press-fitted in the internal surface 14 of the housing 12. The ball head 11 and the ball seat 18 are fixed in place as the result of this press-fitting operation. Furthermore, the counter force resulting from the constriction of the periphery of the closing plate 24 acts concentrically on the internal surface 14 of the housing 12, and prevents these component parts from displacing during the usage of the ball joint, co-operating with the restoring action of the deformed slanting surface 26. A proper preload adjusted by the press-fit pressure for the closing plate 24 is applied to the ball head 11 of the ball joint, and sufficient function of a ball joint is expected.

Figure 7:
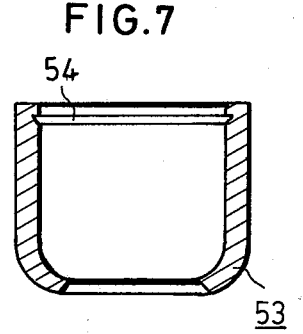
FIG. 7 is a longitudinal sectional view of a housing having a shallow annular groove to receive the closing plate on the internal surface near the open end of the housing.

When the closing plate 24 has to be press-fitted inside the internal surface 14 of the housing 12 more fixedly, the outer diameter of the closing plate 24 is made still larger than the diameter of the internal surface 14. At the same time, if the closing plate 28 with closing slots 30 as shown in FIG. 2, and/or a housing 53 provided with shallow annular groove 54 on the internal surface near the open end of the housing as shown in FIG. 7, the rigidity of fastening the closing plate and the easiness of press-fitting are improved effectively. The assembling of the ball joint shown in FIG. 8 or 9 can be carried out similarly as just described.

Next, a ball joint shown in FIG. 11 is described. A closing plate 55 consists of a dish-shaped core 56 made of rolled steel or spring steel, and a rubber coating member 57 attached to the core by the usual baking method. As is clear from FIG. 13 showing the core 56 covered with the rubber coating member 57, the dish-shaped core 56 has an outer edge 58 with a diameter "A" larger than the diameter "C" of the internal surface 14 near the opening 17 of the housing 12, an annular slanting surface 59 extending inwardly from the outer edge 58, and a flat surface 60 integral with the slanting surface 59. The rubber coating member 57 has a form of a frustum of a cone with a part-conical side surface 61, a depressed bottom surface 62, and a flat top surface 63 to be in direct contact with the ball seat 18. Owing to the frusto-conical form of the rubber coating member 57, the fitting work of the closing plate 55 becomes easy, and the rubber coating member 57 can be made of a less amount of rubber than that of a simple circular cylindrical coating member. An annular sealing lip 64, with a diameter "B" larger than the diameter "A" of the core 56, formed at the periphery of the depressed bottom surface 62 contributes to improve the sealing function of the closing plate 55. Furthermore, the part-conical side surface 61 is shaped so that the outer edge 58 of the core 56 may coincide almost with the part-conical side surface 61 at a some suitable region of it. The bottom half of the rubber coating member 57 from the core 56 to the bottom surface 63 is of such a suitable thickness that the bottom half can exert sufficient resilient force after the ball joint is assembled completely. The combination of the core 56 and the coating member 57 thus specified in forms and dimensions improves the fitting property of the closing plate 55 with the housing 12 at the time of assembling. The core 56 may assume another form similar to any of the closing plates shown in FIGS. 2, 5, 6, and 10, instead of the dish-shaped one.

FIG. 12 shows a closing plate 65 different from that shown in FIG. 13. The rubber coating member 66 of this closing plate 65 has a depressed portion 67 formed at the central portion of the surface 68 of the member 66. This depressed portion 67 serves as a retreat space for the surface 68 compressed at the time of assembling. By changing the size of the depressed portion 67, it is possible to adjust suitably the preload applied to the ball head 11. Furthermore, if the thickness of the bottom half is increased, and the diameter "B'" of the annular sealing lip 69 is made larger, more effective sealing function between the internal surface 14 of the housing 12 and the closing plate 65 can be obtained.

The assembling process of the ball joint illustrated in FIG. 11 is as follows. The ball head 11 of the ball stud 10 and the ball seat 18 are assembled as a unit, and the unit is fitted in the opening 17 of the housing 12. The closing plate 55 is set on the ball seat 18, and is pressed down by a plunger 70 of an assembling apparatus as shown in FIG. 15. As the result of this process, the ball head 11, the ball seat 18, and the closing plate 55 are forced to be press-fitted in the housing 12 continuously as shown in FIG. 15, and are positioned ultimately according to such a proper pressure by the plunger 70 as to be predetermined. Some part of the rubber coating member 57 retreats into a space 71 between the internal surface 14 of the housing 12 and one end portion of the ball seat 18. In this situation, the counter force resulting from the constriction of the periphery of the dish-shaped core 56 acts concentrically on the internal surface 14 of the housing 12, and fits the closing plate 55 fixedly inside the internal surface 14 of the housing 12, co-operating with the restoring action of the deformed slanting surface 59. The ball joint thus assembled as shown in FIG. 11 is subject to a proper preload adjusted by the press-fit pressure applied on the ball head 11 from the closing plate 55 and by the form and thickness of the top half of the rubber coating member 57. A reliable sealing function due to the elasticity of the rubber coating member 57 is established between the internal surface 14 of the housing 12 and the annular sealing lip 64 formed at the periphery of the bottom surface 62 of the rubber coating member 57. Thus, sufficient function of a ball joint is expected. Abrasion and wear of the ball joint can be compensated for by the deformation of the rubber coating member 57, and a long life of the ball joint is ensured.

What I claim is:

1. A ball joint comprising:
   (i) a hollow housing at least part of the inner surface of which terminating at one open end of the housing is cylindrical, the other end of said housing having an aperture smaller than said one open end,
   (ii) a bearing member disposed in said housing,
   (iii) a ball stud including a ball head on a shank, said ball stud being positioned with said ball head within said housing and abutted by said bearing member, and said ball stud extending through said aperture,
   (iv) a resiliently deformable closing plate, said plate being circular and including a circumferential peripheral portion which is inclined with respect to the median plane of the plate such that the plate has concavity at one major face and convexity at the other major face, the greatest diameter of said peripheral portion in the unconstrained state being greater than the internal diameter of said cylindrical inner surface of the housing, said closing plate being press-fitted with resilient deformation into the open end of the housing with its concavity presented towards the bearing member for the application of pressure between the bearing member and the ball head, the peripheral portion engaging at its greatest diameter with the cylindrical inner surface, as a result of the stress generated by resilient deformation of the plate, to secure the plate against return movement with respect to the housing towards said open end.

2. A ball joint, as claimed in claim 1, wherein said circumferential peripheral portion of said closing plate includes a plurality of radial slots extending inwardly part of the way across said portion from its outer edge.

3. A ball joint, as claimed in claim 1, wherein said housing is provided in its cylindrical inner surface with an annular groove to receive the portion of greatest diameter of the closing plate.

4. A ball joint, as claimed in claim 1, wherein said closing plate has a first elastic coating element secured at its one major face and a second elastic coating element secured at its other major face, said second elastic coating element abutting said bearing member, said first elastic coating element having in the unconstrained state, a greatest external diameter which is greater than the internal diameter of said cylindrical inner surface, whereby after press-fitting of the closing plate the portion of greatest diameter of said first elastic coating element is urged by its resilience into contact with said cylindrical inner surface near to said open end.

5. A ball joint, as claimed in claim 4, wherein said first and second elastic coating elements are of natural rubber.

6. A ball joint, as claimed in claim 4, wherein said first elastic coating element has a concavity in its face presented towards said bearing member.

7. A ball joint, as claimed in claim 4, wherein said circumferential peripheral portion of said closing plate includes a plurality of radial slots extending inwardly part of the way across said portion from its outer edge.

8. A ball joint, as claimed in claim 4, wherein said housing is provided in its cylindrical inner surface with an annular groove to receive the portion of greatest diameter of the closing plate.

9. A ball joint comprising:
   (i) a hollow housing at least part of the inner surface of which terminating at one open end of the housing is cylindrical, the other end of the housing being closed,
   (ii) a bearing member disposed in said housing,
   (iii) a ball stud including a ball head on a shank, said ball stud being positioned with said ball head within said housing and abutted by said bearing member, said ball stud extending through said one open end of the housing,
   (iv) a resiliently deformable closing plate, said plate being circular and including a hole to receive the shank with clearance, said plate including a circumferential peripheral portion which is inclined with respect to the median plane of the plate such that the plate has concavity at one major face and convexity at the other major face, the greatest diameter of said peripheral portion in the unconstrained state being greater than the internal diameter of said cylindrical inner surface of the housing, said closing plate being disposed about the shank and press-fitted with resilient deformation into the open end of the housing with its concavity presented outwardly of the housing and its convexity presented towards the bearing member for application of pressure between the bearing member and the ball head, the peripheral portion engaging at its greatest diameter with the cylindrical inner surface, as a result of the stress generated by resilient deformation of the plate, to secure the plate against return movement with respect to the housing towards said open end.

* * * * *

UNITED STATES PATENT AND TRADEMARK OFFICE
CERTIFICATE OF CORRECTION

PATENT NO. : 4,163,617
DATED : August 7, 1979
INVENTOR(S) : Akira Nemoto

It is certified that error appears in the above—identified patent and that said Letters Patent is hereby corrected as shown below:

On the cover sheet, Assignee should read

-- Musashiseimitsukogyo Kabushikikaisha, Japan --.

Signed and Sealed this

First Day of April 1980

[SEAL]

Attest:

SIDNEY A. DIAMOND

Attesting Officer

Commissioner of Patents and Trademarks